United States Patent Office 3,185,721
Patented May 25, 1965

3,185,721
THIOPHOSPHONIC ACID ESTERS OR ESTER AMIDES AND PROCESSES FOR THE PRODUCTION THEREOF
Gerhard Schrader, Wuppertal-Cronenberg, Germany, assignor to Farbenfabriken Bayer Aktiengesellschaft, Leverkusen, Germany, a German corporation
No Drawing. Filed Mar. 3, 1961, Ser. No. 93,028
Claims priority, application Germany, Mar. 5, 1960, F 39,691
9 Claims. (Cl. 260—461)

The present invention relates to and has as its objects a new and useful process for producing thiophosphonic acid esters or ester amides. The class of compounds which may be obtained according to the inventive process may be represented by the following general formula:

in which R stands for an aliphatic or aromatic radical and X and Y stand for substituted hydroxy, mercapto or amino groups.

Various processes are already known for the production of thionophosphonic acid ester amides. Thus, for example, it is possible to exchange in thionophosphonic acid dihalides one or two halogen atoms for ester radicals, thioester radicals or amino radicals. It is also possible to react dithiophosphonic acid anhydrides with amines, alcohols or mercaptans and then esterifying the free thiol radicals. Thiono-thiol-phosphonic acid esters, in which the thiol group is still free, can be esterified in known ways in conventional manner. Also thiono-thiol-phosphonic acid amides with free SH groups can be converted into thiono-thiol-phosphonic acid ester amides in the same manner.

The main object of the present application is to provide a new simple process for the production of thionophosphonic acid-diesters or -ester amides.

This new method consists in exchanging in thionophosphonous acid diamides one or both amino groups for mercaptan or alcohol radicals and subsequently reacting this intermediate product with sulfur. The new process has the advantage of being more generally applicable and, in some cases, leading to compounds which were not obtainable in a hitherto known manner.

The aforesaid reaction may be shown by the following general equation:

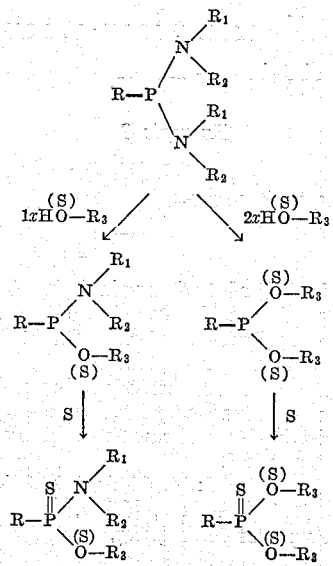

In the above formulae R, $R_1$ and $R_2$ stand for eventually substituted aliphatic or aromatic radicals.

Thus, R may be a saturated or unsaturated aliphatic radical such as ethyl, methyl, propyl, butyl, hexyl, dodecyl or higher members of the same kind or also unsaturated analogues of the aforementioned groups, R furthermore may stand for an araliphatic radical such as benzyl, phenyl-ethyl and the like. Also substituted aliphatic radicals are within the scope of this invention. Examples for this kind of groups may be halo-alkyl groups, the alkoxy-alkyl groups, the nitro-alkyl groups or corresponding alkylene groups and the like. Aromatic radicals within the meaning of R may be phenyl and naphthyl radicals, substituted by various groups such as lower alkyl-, halogen-, nitro-, amino-, alkoxy-, alkyl-mercapto groups and the like.

The other groups $R_1$–$R_3$ mentioned above may be of the same type as said before in case of R. The groups $OR_3$—$SR_3$ being bound to the phosphorous atom may be the same or different in case they are both present at the phosphorous atom.

The aforedescribed reaction is generally carried out in suitable inert solvents or diluents, whereby in some instances an excess of the alcohol or mercaptan to be reacted may be used as solvent.

Inert solvents in the meaning of this invention are solvents such as benzene, toluene, xylene, chloro-benzene and the like but as stated above the reaction also proceeds sometimes very good without any solvents at all. The temperature at which the present invention is carried out usually is slightly elevated, say above 50° C. Usually the reaction is carried out at the boiling temperature of the solvent used, that is between about 80–150° C. If no solvent is used the reaction even may be completed at temperatures above the aforesaid range.

Alcohols, phenols and mercaptans to be reacted in the inventive way with phosphonous acid-di-amides are more specifically a lower alkyl mercapto substituted alcohol or alkyl mercaptan, a lower alkyl-amino substituted lower alcohol or alkyl-mercaptan, a lower alkoxy carbonyl substituted lower alcohol or alkyl mercaptan, a lower alkyl amino carbonyl substituted lower alcohol or alkyl mercaptan, a carbonic or carbamic acid ester, a phosphoric, phosphonic or phosphinic (thio-) acid with one free SH or OH group, a phenol, a thio-phenol as well as substituted products thereof, containing substituents preferably lower alkyl groups, halogen atoms, nitro groups or cyano groups.

It has to be understood that the afore-mentioned compounds are given by way of illustration only without limiting the invention whatsoever.

In the phosphonous acid-diamines used, the amino groups are more specifically lower di-alkyl-amino-groups such as the di-methyl-amino group, the di-ethyl-amino group, the di-propyl-amino group and the like. Also cyclic amines such as the pyperidine or morpholine and the like are well within the scope of the inventively used phosphonous acid-diamines.

The compounds obtainable according to the invention are pest control agents most of which have insecticidal action and are used for plant protection. Many of the compounds which can be produced according to the present invention are distinguished by a low toxicity against warm-blooded animals while being sufficiently active against damaging insects on plants and live-stock.

The following examples are given for the purpose of illustrating the invention.

*Example 1*

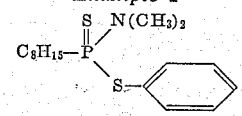

58 g. (0.25 mol) of iso-octenyl-phosphonous acid-bis-dimethylamide (B.P. 80° C./1 mm. Hg) are dissolved in 100 ml. of benzene. 28 g. of thiophenol are added dropwise at 80° C. with stirring. The solution is kept at 80° C. for one hour, and 8 g. of sulfur are then added in small portions. It is heated to 80° C. for a further 30 minutes, then cooled, and the reaction product poured into 200 ml. of ice water. The separated oil is washed with water and dried with sodium sulfate. Upon distillation of the solvent, 71 g. of the new compound are obtained in the form of a water-insoluble oil. Yield 86% of the theoretical.

Calculated for mol 327: N, 4.3%; S, 19.6%; P, 9.5%. Found: N, 4.0%; S, 20.1%; P, 9.3%.

$DL_{50}$ on rats per os 500 mg./kg.

Example 2

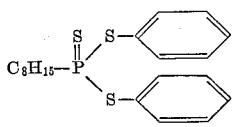

58 g. (0.25 mol) of iso-octenyl-phosphonous acid-bis-dimethyl amide are dissolved in 100 ml. of benzene. 55 g. of thiophenol are added dropwise at 80° C. The solution is kept at 80° C. for one hour and 8 g. of sulfur are then added in portions. It is stirred at 80° C. for a further hour and then worked up as described in Example 1. In this way, 82 g. of the new compound are obtained in the form of a water-insoluble oil. Yield 84% of the theoretical.

Calculated for mol 392: S, 24.4%; P, 7.9%. Found: S, 23.8%; P, 7.4%.

$DL_{50}$ on rats per os 500 mg./kg.

Example 3

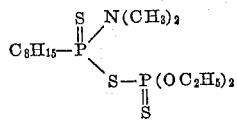

58 g. (0.25 mol) of iso-octenyl-phosphonous acid-bis-dimethyl amide are placed in a flask provided with stirrer. 93 g. of diethyl dithiophosphoric acid are then added dropwise at 100° C. with stirring. The mixture is heated at 100° C. for a further hour, and then 8 g. of sulfur are added in portions. The reaction product is kept at 100–120° C. for a further 20 minutes and then worked up as described in Example 1. In this way, 48 g. of the new ester are obtained in the form of a water-insoluble oil. Yield 47% of the theoretical.

Calculated for mol 403: N, 3.5%; S, 23.8%; P, 15.4%. Found: N, 3.9%; S, 21.8%; P, 14.9%.

$DL_{50}$ on rats per os 500 mg./kg.

Example 4

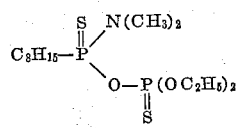

58 g. (0.25 mol) of iso-octenyl-phosphinic acid-bis-dimethyl amide are used. 85 g. of diethyl-monothiophosphoric acid are added thereto at 100° C. The mixture is heated to 100° C. for one hour and 8 g. of sulfur are then introduced into the reaction product. It is stirred at 100° C. for a further hour and then worked up in the usual manner. 69 g. of the new compound are thus obtained in the form of a water-insoluble oil. Yield 71% of the theoretical.

Calculated for mol 387: N, 3.6%; S, 16.5%; P, 16.0%. Found: N, 3.7%; S, 16.2%; P, 15.8%.

$DL_{50}$ on rats per os 250 mg./kg.

Example 5

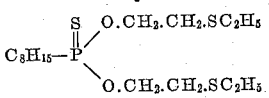

58 g. (0.25 mol) of iso-octenyl-phosphonous acid-bis-dimethyl amide are used. 54 g. of β-oxethyl-thioethyl ether are added dropwise thereto at 120° C. The mixture is kept at 120° C. and 8 g. of sulfur are then added in portions. The reaction product is kept at 100–120° C. for a further 20 minutes and then worked up as described in Example 1. In this way, 80 g. of the new compound are obtained in the form of a water-insoluble oil. Yield 83% of the theoretical.

Calculated for mol 384: S, 25.0%; P, 8.0%. Found: S, 25.0%; P, 7.99%.

$DL_{50}$ on rats per os 250 mg./kg.

Example 6

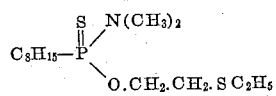

58 g. (0.25 mol) of iso-octenyl-phosphonous acid-bis-dimethyl amide are heated to 120° C. 27 g. of β-hydroxethyl-thioethyl ether are added dropwise thereto with stirring. The mixture is heated to 120° C. for one hour and 8 g. of sulfur are then added in portions. The reaction product is kept at 120° C. for a further half hour and then worked up as described in the form of a water-insoluble oil. Yield 83% of the theoretical.

Calculated for mol 323: N, 4.3%; S, 19.8%; P, 9.6%. Found: N, 4.0%; S, 20.2%; P, 9.4%.

$DL_{50}$ on rats per os 500 mg./kg.

Example 7

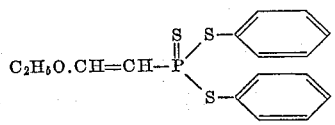

48 g. (0.25 mol) of β-ethoxy-vinyl-phosphonous acid-bis-dimethyl amide (B.P. 67° C./1 mm. Hg) are dissolved in 100 ml. of benzene. 55 g. of thiophenyl are added dropwise at 80° with stirring. Stirring is continued at 80° C. for one hour and 8 g. of sulfur are then added in portions. The reaction product is kept at 80° C. for a further half hour and then worked up as described in Example 1. In this way, 69 g. of the new compound are obtained in the form of a water-insoluble oil. Yield 78% of the theoretical.

Calculated for mol 352: S, 27.2%; P, 8.8%. Found: S, 26.8%; P, 8.7%.

$DL_{50}$ on rats per os 1000 mg./kg.

Example 8

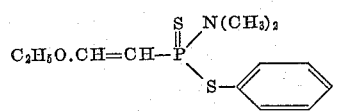

48 g. (0.25 mol) of β-ethoxy-vinyl-phosphonous acid-bis-dimethyl amide are dissolved in 100 ml. of benzene. 28 g. of thiophenol are added dropwise at 80° C. with stirring. The mixture is kept at 80° C. for a further hour and 8 g. of sulfur are then added in portions. After working up in usual manner, 63 g. of the new compound are obtained in the form of a water-insoluble oil. Yield 88% of the theoretical.

Calculated for mol 287: N, 4.9%; S, 22.3%; P, 10.8%. Found: N, 4.6%; S, 22.3%; P, 10.5%.

$DL_{50}$ on rats per os 100 mg./kg.

Example 9

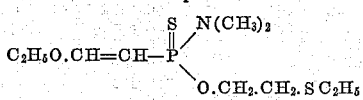

48 g. (0.25 mol) of β-ethoxy-vinyl-phosphonous acid-bis-dimethyl amide are used. 27 g. of β-hydroxethyl-thioethyl ether are added dropwise thereto at 120° C. The mixture is kept at 120° C. for one hour and 8 g. of sulfur are then added. After working up in usual manner, 60 g. of the new compound are obtained in the form of a water-insoluble oil. Yield 85% of the theoretical.

Calculated for mol 283: N, 4.9%; S, 22.6%; P, 10.9%. Found: N, 4.8%; S, 22.1%; P, 10.7%.

$DL_{50}$ on rats per os 250 mg./kg.

Example 10

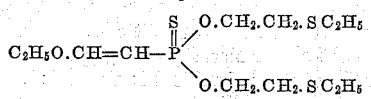

48 g. (0.25 mol) of β-ethoxy-vinyl-phosphonous acid-bis-dimethyl amide are used. 54 g. of β-hydroxethyl-thioethyl ether are added dropwise thereto at 120° C. The mixture is kept at 120° C. for one hour and 8 g. of sulfur are then added. The reaction product is kept at 120° C. for half an hour and then worked up in usual manner. 80 g. of the new compound are thus obtained in the form of a water-insoluble oil. Yield 93% of the theoretical.

Calculated for mol 344: S, 27.9%; P, 9.8%. Found: S, 27.3%; P, 8.9%.

$DL_{50}$ on rats per os 250 mg./kg.

Example 11

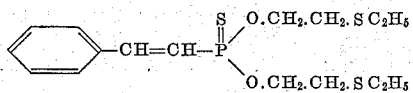

56 g. (0.25 mol) of styryl-phosphonous acid-bis-dimethyl amide (B.P. 117° C./1 mm. Hg) are heated to 120° C. 54 g. of β-hydroxethyl-thioethyl ether are then added dropwise thereto with stirring. The mixture is kept at 120° C. for one hour and 8 g. of sulfur are then added. Stirring is continued at 120° C. for a further hour and the product is worked up in the usual manner. 76 g. of the new compound are thus obtained in the form of a water-insoluble oil. Yield 81% of the theoretical.

Calculated for mol 376: S, 25.6%; P, 8.25%. Found: S, 25.6%; P, 8.25%.

$DL_{50}$ on rats per os 50 mg./kg.

Example 12

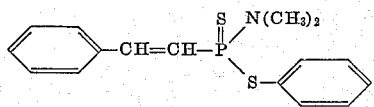

56 g. (0.25 mol) of styryl-phosphonous acid-bis-dimethyl amide are dissolved in 100 ml. of benzene. 28 g. of thiophenol are added dropwise thereto at 80° C. with stirring. The mixture is kept at 80° C. for a further hour and 8 g. of sulfur are then added with stirring. After working up in the usual manner, 65 g. of the new compound are obtained in the form of a water-soluble oil. Yield 81% of the theoretical.

Calculated for mol 319: N, 4.4%; S, 20.0%; P, 9.7%. Found: N, 4.3%, S, 19.8%; P, 9.2%.

$DL_{50}$ on rats per os 1000 mg./kg.

Example 13

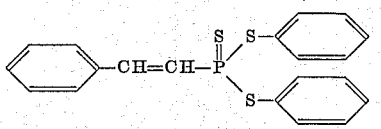

56 g. (0.25 mol) of styryl-phosphonous acid-bis-dimethyl amide are dissolved in 100 ml. of benzene. 55 g. of thiophenol are then added dropwise at 80° C. with stirring. The mixture is kept at 80° C. for one hour and 8 g. of sulfur are then stirred in. The reaction product solidifies in crystalline form. Upon recrystallisation from ethyl acetate/ligroin, 65 g. of the new compound of M.P. 112° C. are obtained. Yield 68% of the theoretical.

$DL_{50}$ on rats per os 1000 mg./kg.

Example 14

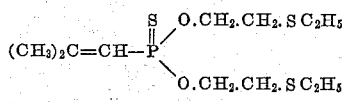

44 g. (0.25 mol) of isobutenyl-phosphonous acid-bis-dimethyl amide (B.P. 52° C./1 mm. Hg) are used. 54 g. of β-hydroxethyl-thioethyl ester are added thereto at 120° C. The mixture is heated to 120° C. for one hour and 8 g. of sulfur are then stirred in. After working up in the usual manner, 44 g. of the new ester are obtained in the form of a water-insoluble oil. Yield 54% of the theoretical.

Calculated for mol 328: S, 29.3%; P, 9.4%. Found: S, 28.8%; P, 9.6%.

$DL_{50}$ on rats per os 100 mg./kg.

Example 15

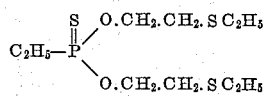

37 g. (0.25 mol) of ethyl-phosphonous acid-bis-dimethyl amide (B.P. 55° C./12 mm. Hg) are dissolved in 300 cc. of benzene. To the solution thus obtained are added at 80° C. 53 g. (0.5 mol) of β-ethylmercapto-ethanol, the reaction mixture is heated with stirring at 80° C. for a further 2 hours, then treated with 8 g. of a finely powdered sulfur and the temperature maintained at 80° C. for a further hour. The reaction mixture is then poured into 300 cc. of ice water, the benzene solution separated, washed with water until the reaction is neutral and dried over sodium sulfate. Atfer distilling off the benzene in a vacuum there remain 41 g. (54% of the theoretical) of the ethyl-thionophosphonic acid-O,O-bis-(β-ethylmercapto-ethyl)-ester in the form of a colorless, water-insoluble oil.

*Analysis.*—Calculated for molecular weight 302: S, 31.8%; P, 10.3%. Found: S, 30.6%; P, 10.8%.

$DL_{50}$ on rats per os 25 mg./kg.

Example 16

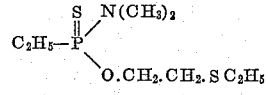

37 g. (0.25 mol) of ethyl-phosphonous acid-bis-dimethyl amide are dissolved in 300 cc. of benzene and to this solution there are added with stirring at 80° C. 27 g. (0.25 mol) of β-ethylmercapto-ethanol. To complete conversion, the reaction mixture is heated to 80° C. for 4 hours, then treated with 8 g. of finely powdered sulfur and finally heated to 80° C. for a further hour. After working up in the manner described in Example 15, 32 g. (53% of the theoretical) of ethyl-thionophosphonic acid-O-(β-ethylmercaptoethyl)-ester-N-dimethyl amide of B.P. 88° C./0.01 mm. Hg are obtained.

$DL_{50}$ on rats per os 100 mg./kg.

Example 17

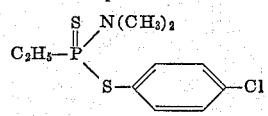

To a solution of 37 g. (0.25 mol) of ethyl-phosphonous acid-bis-dimethyl amide in 200 cc. of benzene there are added with stirring at 80° C. 37 g. of 4-chlorophenyl-mercaptan, dissolved in 50 cc. of benzene, the reaction mixture is then heated at 80° C. for one hour and treated with 8 g. of finely powdered sulfur while stirring. To complete the reaction, the mixture is heated to 80° C. for a further hour, then cooled to room temperature and poured into 300 cc. of ice water. The benzene layer is separated, washed with water until the reaction is neutral and finally dried over sodium sulfate. After distilling off the solvent, the residue solidifies in crystalline form. 53 g. (75% of the theoretical) of ethyl-thionophosphonic acid-S-(4-chlorophenyl)-ester-N-dimethyl amide are obtained. Upon recrystallisation from ligroin, the product melts at 80° C.

$DL_{50}$ on rats per os 1000 mg./kg.

I claim:

1. The process for the production of a member selected from the group consisting of thionophosphonic acid-diester and thiophosphonic ester amide which comprises contacting a phosphonous acid diamide of the following formula:

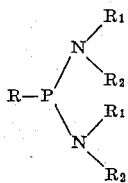

in which R, $R_1$, and $R_2$ when take alone stand independently for a member selected from the group consisting of alkyl and alkenyl having up to 12 carbon atoms, substituted derivatives of said alkyl and alkenyl wherein the substituents are selected from the group consisting of halogen, lower alkoxy and nitro, benzyl, phenyl ethyl, phenyl, naphthyl and substituted derivatives of said phenyl and naphthyl wherein the substituents are selected from the group consisting of lower alkyl, halogen, nitro and amino, and wherein $R_1$ and $R_2$ when taken together with N stand for a member selected from the group consisting of piperidyl and morpholinyl with a member selected from the group consisting of phenol, thiophenol, substituted phenol and substituted thio phenol wherein the substituents on said substituted phenol and substituted thiophenol are selected from the group consisting of lower alkyl, halogen, nitro and cyano at a temperature between about 50° C. and 150° C. and subsequently reacting this intermediate with sulfur.

2. The process of claim 1 wherein the molecular ratio of diamide to phenol is about 1:1.
3. The process of claim 1 wherein the molecular ratio of diamide to phenol is about 1:2.
4. The process of claim 1 wherein the molecular ratio of diamide to thiophenol is about 1:1.
5. The process of claim 1 wherein the molecular ratio of diamide to thiophenol is about 1:2.
6. The process of claim 1 wherein the molecular ratio of diamide to substituted phenol is about 1:1.
7. The process of claim 1 wherein the molecular ratio of diamide to substituted phenol is about 1:2.
8. The process of claim 1 wherein the molecular ratio of diamide to substituted thiophenol is about 1:1.
9. The process of claim 1 wherein the molecular ratio of diamide to substituted thiophenol is about 1:2.

References Cited in the file of this patent

UNITED STATES PATENTS 2,907,787     Hoffmann et al. _____ Oct. 6, 1959
3,036,110     Schliebs _____ May 22, 1962

OTHER REFERENCES

Kosolapoff: "Organo-Phosphorus Compounds," John Wiley and Sons, New York, New York (1950), page 141.

Arbuzov et al.: "Bull. Acad. Sci. U.S.S.R., Div. Chem. Sci." 1955, pages 935–943.

Hoffmann et al.: "J. Am. Chem. Soc.," 1958, vol. 80, pp. 1150–1154.